United States Patent [19]

Young

[11] 4,417,129

[45] Nov. 22, 1983

[54] POWER SOURCE FOR ARC WELDER

[75] Inventor: Russell D. Young, Redondo Beach, Calif.

[73] Assignee: Creative Pathways, Incorporated, Torrance, Calif.

[21] Appl. No.: 451,466

[22] Filed: Dec. 20, 1982

[51] Int. Cl.³ .............................................. B23K 9/10
[52] U.S. Cl. .............................. 219/130.32; 219/130.4
[58] Field of Search ....................... 219/130.32, 130.21, 219/130.31, 130.33, 130.4, 130.5, 130.1

[56] References Cited

U.S. PATENT DOCUMENTS

| | | | |
|---|---|---|---|
| 3,728,516 | 4/1973 | Daspit | 219/130.33 |
| 4,048,468 | 9/1977 | Maule | 219/130.1 |
| 4,159,409 | 6/1979 | Hedberg | 219/130.21 |
| 4,201,906 | 5/1980 | Puschner | 219/130.33 |

*Primary Examiner*—C. C. Shaw
*Attorney, Agent, or Firm*—Edward A. Sokolski

[57] ABSTRACT

A power source for an arc welder which employs a high voltage, short duration impulse for periodically exciting an arc for use in arc welding. The device operates from an AC power source and employs a single silicon controlled rectifier (SCR) which is triggered in response to the output of a voltage controlled oscillator. The frequency of the voltage controlled oscillator is controlled by a programmer in conjunction with a feedback signal which is in accordance with the arc welding current, the output of the voltage controlled oscillator thus being varied as needed to maintain the welding current at the value programmed by the programmer. The output of the oscillator is divided down to produce a series of pulses which are used not only to trigger the SCR but also to trigger the arc starter and provide synchronization for the programmer. An inductor is used to commutate the SCR, i.e., cut the SCR off a predetermined time period after the triggering thereof.

10 Claims, 4 Drawing Figures

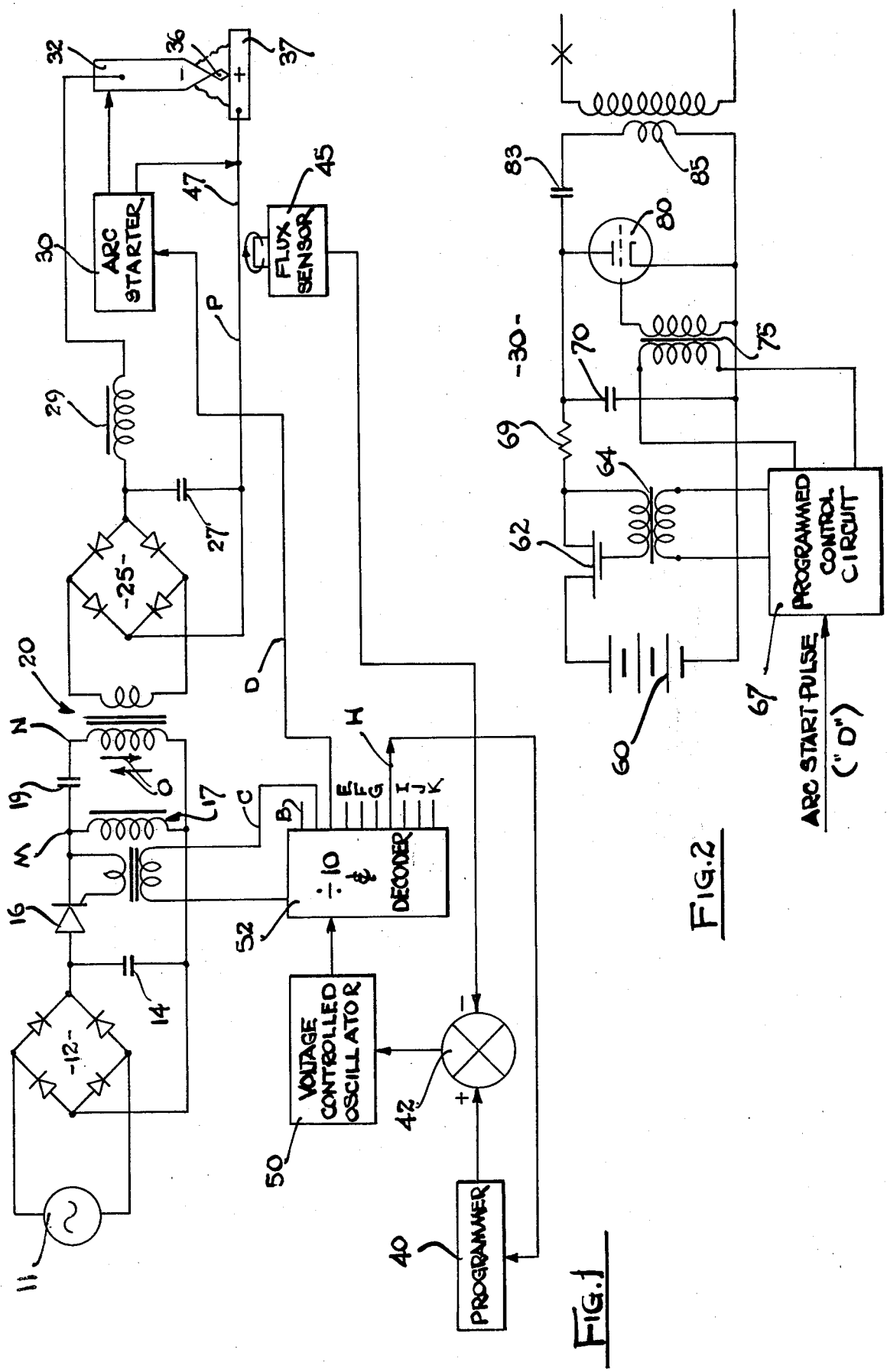

POWER SOURCE FOR ARC WELDER

This invention relates to power supplies for arc welders, and more particularly to such a power supply employing synchronous operation in response to a programmer and a feedback circuit which is responsive to the welding current.

Arc welding machines which employ high power pulses in the very low radio frequency range (10–30 khz) for initiating and sustaining the welding current have been described in the prior art. In order to assure efficient operation in such circuits, the welding current should be precisely controlled to provide the desired shape and duration of the welding current pulse. Many prior art systems employ relatively low voltage and high current in their implementations. Such high current systems tend to have greater losses and lower efficiency than high voltage systems. Further, in view of the higher current handling capacities required for the components, such components generally tend to become bulkier and more expensive and require large cooling systems due to the heat dissipation involved.

In order to overcome this problem, high voltage systems have been developed such as described in U.S. Pat. No. 3,728,516 to Daspit. Other prior art welding power systems are described in U.S. Pat. No. RE29,441 to Ericsson; U.S. Pat. No. 4,292,497 to Paton et al.; and U.S. Pat. No. 4,159,409 to Hedburg. The Daspit patent employs a first silicon controller rectifier (SCR) circuit for triggering the arcing current and a second SCR circuit for commutating or turning the arcing current off. Further, in Daspit, there is no precise synchronized control of the arcing current to assure optimum operation. In the type of dual SCR circuit operation described in Daspit, proper logic must be provided to drive not only the triggering SCR but also the cut-off SCR which both complicates the circuitry and leaves the equipment vulnerable to malfunction in the event of a failure in the operation of the associated portion of the logical control circuit or firing of the second SCR in response to a noise pulse.

The power system of the present invention obviates the aforementioned shortcomings of the prior art, first by employing high voltage pulse operation which for a given amount of power requires less current. Further, the system of the present invention employs an inductor for commutation or unfiring of the trigger SCR which obviates the need for a second SCR circuit for commutation. Further, the system of the present invention employs a pulse synchronization circuit responsive to a voltage controlled oscillator which provides the triggering pulse for the SCR, an arc start pulse for the arc starter and a synchronization pulse for the system programmer, these pulses being provided in appropriate time relationship for optimum operation of the system.

Briefly described, the system employs a single SCR circuit which is triggered by a control pulse developed in response to the voltage controlled oscillator. The frequency of the voltage controlled oscillator is controlled by a programmer operating in conjunction with a feedback circuit which measures the welding current and maintains the programmed welding current at the desired value in response to the measured welding current. The output of the voltage controlled oscillator is divided down to produce a series of control trigger pulses which are used to control not only the firing of the SCR but also to provide a start pulse for the arc starter and a synchronization pulse for the programmer, in a predetermined time relationship. The SCR is commutated or turned off after it is fired by means of an inductive circuit which has an inductance of a high enough value such that it will not commence its commutation action until the current needed for the welding arc has fully flowed through an output transformer used to couple the arc current to the load.

It is therefore an object of this invention to provide an improved arc welding power source wherein the arc welding current is more precisely controlled in response to a programmer.

It is another object of this invention to provide an arc welding power source having higher efficiency than such prior art devices.

It is still another object of this invention to provide an arc welding power source with more economical construction and higher reliability than similar prior art devices.

Other objects of this invention will become apparent as the description proceeds in connection with the accompanying drawings of which:

FIG. 1 is a schematic drawing of a preferred embodiment of the invention;

FIG. 2 is a schematic drawing of an arc starter which may be employed in the embodiment of FIG. 1.

Figure 3A:
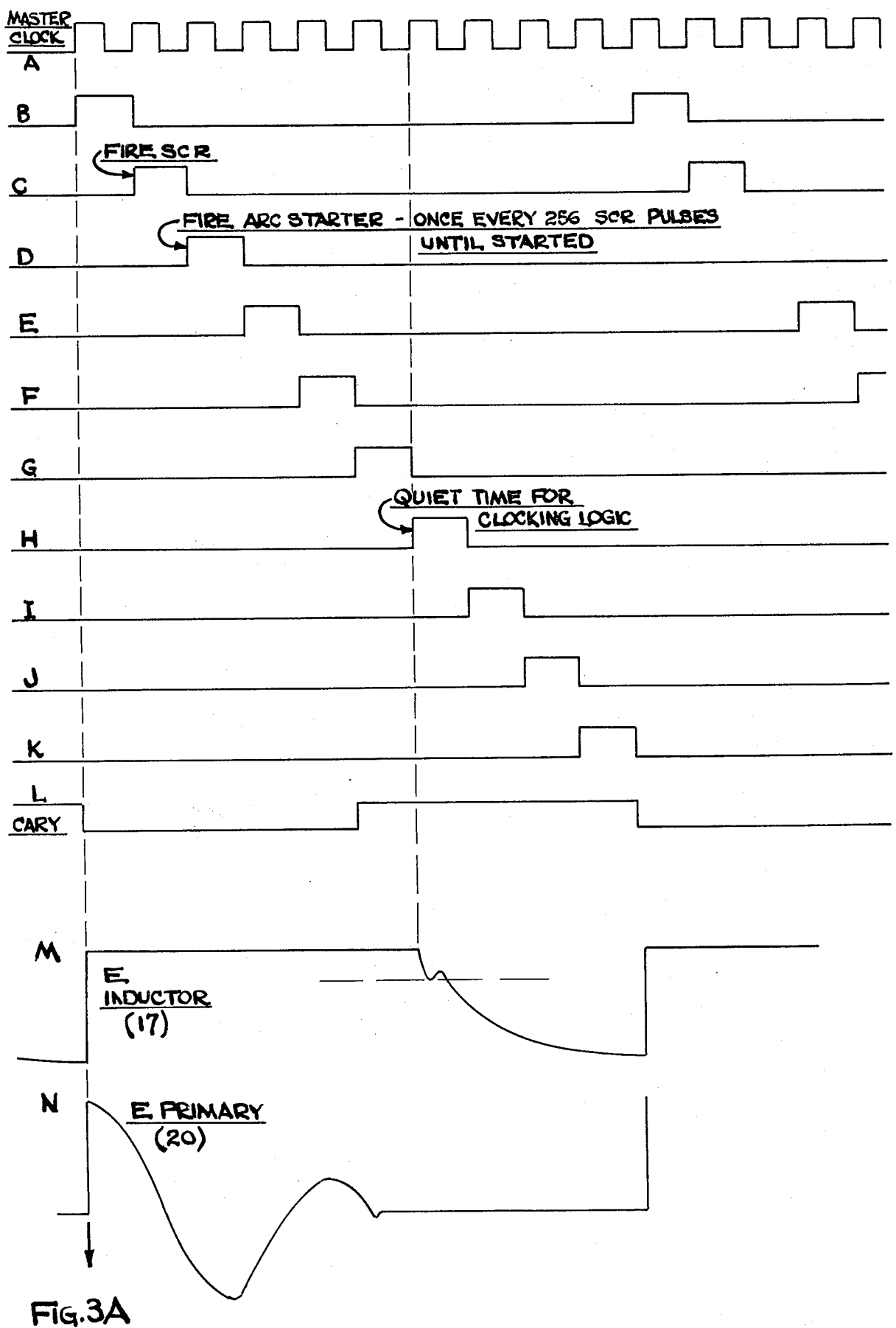
FIGS. 3A and 3B are a series of wave forms illustrating the operation of the preferred embodiment of the invention.

Referring now to FIG. 1, a preferred embodiment of the invention is schematically illustrated. The output of AC power source 11, which typically may be 120, 240 or 480 volts, is fed to bridge rectifier 12. The output of rectifier 12 is fed across a filter capacitor 14 which typically has a capacitance of the order of 10,000 microfarads. The DC across capacitor 14 is fed between the anode and cathode of SCR 16; inductor 17 being connected between one of the terminals of the capacitor and the cathode of the SCR. Capacitor 19 is connected in series with the primary winding of output transformer 20, this series circuit being connected in parallel with inductor 17. The inductance of inductor 17 is typically about 10 times that of the primary winding of transformer 20. Typical values of these components are 400 microhenries for inductor 17, 36 microhenries for the primary winding of transformer 20 and 0.5 microfarads for capacitor 19.

The secondary winding of transformer 20 is connected to full wave rectifier 25, the rectified output of rectifier 25 being fed across capacitor 27 which acts as a filter capacitor. The DC output of rectifier 25 is fed through inductor 29 to welding electrode 32. Arc starter 30 is connected to welding electrode 32 and is used to initiate the welding current for welding the working load 36 which is placed between welding cathode 32 and welding anode 37. The operation of arc starter 30 will be described in detail in connection with FIG. 2. Inductor 29 is employed as a filter for preventing the arc start pulse from being fed back into the power supply.

The welding operation is controlled by programmer 40 which is preset to provide the desired welding current for the particular application requirement at hand. The control signal from programmer 40, which represents the desired welding current, is fed to summing device or comparator 42. Flux sensor 45 is coupled to the power line 47 and anode 37 and provides an output voltage in accordance with the welding current. Flux sensor 45 may be a linear output Hall effect transducer (LOHET), such as the Model No. 92SS12-2 available from the Micro Switch Division of Honeywell Corporation.

The output of the flux sensor 45 is fed to summing device 42 where it is algebraically summed with the welding current control signal fed to the summing device from programmer 40. When the measured current, as represented by the voltage output of flux sensor 45, is equal to the programmed current, as represented by the output of programmer 40, the summing device 42 has a zero output to voltage controlled oscillator 50. When the sensed current is greater than the programmed current, the output of the summing device is such as to reduce the frequency of the oscillator so as to reduce the welding current and vice-versa. In this manner, the feedback control circuit maintains the welding current at the value programmed into programmer 40.

Voltage controlled oscillator 50 may be a conventional programmable oscillator integrated circuit, such as an XR-2207 manufactured by Exar Company.

Voltage controlled oscillator 50 may operate at a frequency of the order of 100 to 300 khz. The output of the oscillator, which consists of pulses having sharp leading edges suitable for triggering pulses, is fed to frequency divider and decoder 52 which divides the frequency by 10 (typically to a frequency of the order of 10 to 30 khz). Divider and decoder 52 provide a firing pulse for silicon controlled rectifier 16, an arc start pulse for arc starter 30, and a synch pulse for programmer 40.

Referring now additionally to the wave forms of FIGS. 3A and 3B, the operation of the device of the invention will now be described. To facilitate this explanation, FIG. 1 has been marked with the appropriate letter designated to the various wave shapes in FIGS. 3A and 3B, to show where these wave shapes appear. The output of voltage controlled oscillator is shown on line "A" of FIG. 3A. The master clock is then divided by 10 and decoded in divider and decoder 52 to produce 10 separate phases, each at 1/10 the master clock frequency. The pulse output designated "C" is used to trigger SCR 16 while the pulse signal designated "D" is used to trigger arc starter 30. The pulse designated "H" is used as a synch pulse for synchronizing the operation of programmer 40. The firing pulse "C" fires SCR 16 which causes the current "O" to flow in the primary winding of transformer 20, voltage "N" appearing across this primary. As indicated at "M", substantially no current flows through inductor 17 during this firing time; the volage across the inductor remaining substantially constant during this period. This is in view of the fact that the inductance of inductor 17, as already noted, is substantially higher than that of the primary of the transformer (400 microhenry vs. 36 microhenry).

After the firing pulse "N" has been generated in the primary of the transformer 20, inductor 17 provides a flow path for the current to develop a back voltage to the SCR which operates to turn off or "commutate" the SCR. "P" shows the output arc current provided to the load. It is possible to also operate the device in an AC mode of operation in which case rectifier 25 is eliminated. With such operation, the output arc current is as shown at "Q".

Figure 3B:
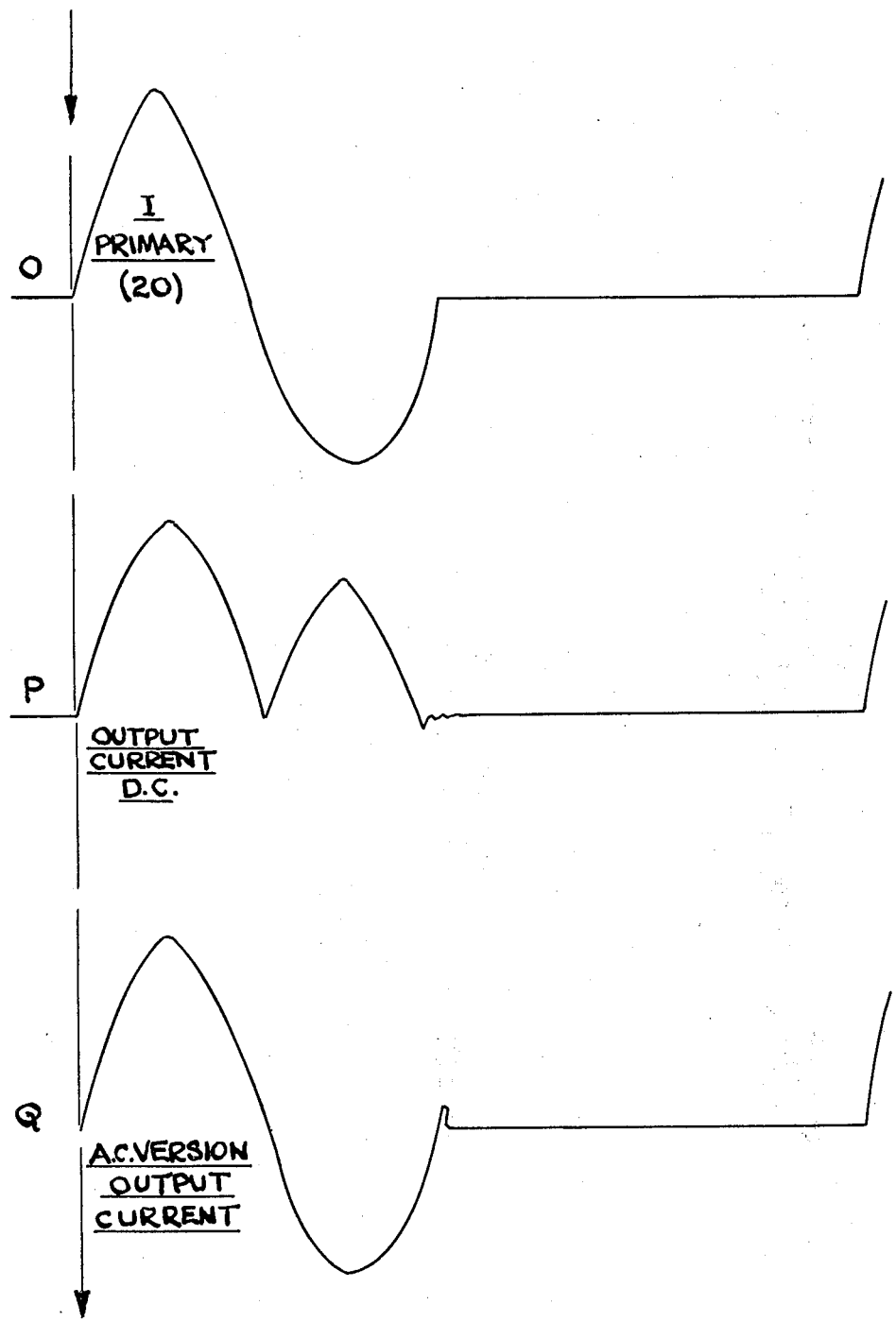

It is to be noted by reference to FIGS. 3A and 3B that the arc starter is actuated in response to pulse "D" when the current shown at "O" is at its peak, thereby optimizing the welding current. It is further to be noted that the synchronization pulse "H" is provided during a "quiet" time between arc pulses, thereby avoiding noise on this synch signal which might impair its effect in synchronizing the operation of the programmer. It is further to be noted that inductor 29 is saturable and saturates at times when arcing current is flowing therethrough, thus having a relatively low impedance at such times.

Referring now to FIG. 2, an arc starter circuit which may be used for element 30 for FIG. 1 is schematically illustrated. A power source 60 is connected to the drain of high power MOS field effect transistor 62; power source 60 typically being of the order of 400 volts. The secondary of transformer 63 is connected between the control gate and source of the transistor. The primary of transformer 64 is connected to programmed control circuit 67. Control circuit 67 is programmed to provide a series of output pulses, the number of such pulses being determined by the program, which can be adjustable. Circuit 67 provides such pulses a predetermined time after the arc start pulse "D" is received thereby. MOS 62 is a high power device such as a V-MOS which is capable of handling high currents. Each time a pulse appears at the control gate of the MOS, a high current pulse is fed from power source 60 through resistor 69 to capacitor 70. The capacitor 70 thus is charged incrementally to a value dependent upon the number of pulses fed from circuit 67 to the primary of transformer 64.

When the arc start pulse "D" is fed to control circuit 67, a drive pulse is fed to the primary of transformer 75 which drives high current capacity vacuum tube 80 into conduction. Tube 80 may comprise a high current krytron #KN-6 commercially available from EG&G Electro Optics Company. When tube 80 is fired, a high current pulse is fed through capacitor 83 to the primary of stepup transformer 85, the secondary of this transformer providing the starting voltage for the arc. Typically, the pulses in the secondary of transformer 85 will be from 8–25 kilovolts depending on the programmed number of pulses fed from program control circuit 67 and will have a width of the order of 1 microsecond. In this manner, a high arc starting voltage can be provided, the magnitude of this starting voltage being programmable as application requirements may dictate.

While the invention has been describved and illustrated in detail, it is to be clearly understood that this intended by way of illustration and example only and is not to be taken by way of limitation, the spirit and scope of this invention being limited only by the scope of the following claims.

I claim:

1. A power source for providing pulses welding current to the electrodes of an arc welder comprising:

means for supplying DC power, electronic switching means having current carrying electrodes between which the DC power is fed and a switching control electrode, means for generating a series of sequential trigger pulses, each of said pulses appearing at a separate terminal, a first one of said trigger pulses being fed to the switching control electrode of the switching means to effect the firing thereof to cause current pulses to flow between the current carrying electrode, programmer means for generating a signal in accordance with a predetermined program representing the desired welding current, means for sensing the welding current and providing a feedback signal in accordance therewith, means for comparing the feedback signal with the programmer means signal and generating a signal in accordance with any difference therebetween, the output of the comparing means being fed to said trigger pulse generating means to control the frequency of the trigger pulses, arc starter means for starting the welding arc, said arc starter means being triggered in response to a second one of said trigger pulses, commutating inductor means for unfiring said electronic switching means a predetermined time after the firing thereof, and means for coupling the current pulses passing between the current carrying electrodes of the electronic switching means to the arc welder electrodes.

2. The power source of claim 1 wherein the electronic switching means is an SCR.

3. The power source of claim 1 wherein the means for supplying DC power comprises an AC power source and a rectifier for rectifying the AC to DC.

4. The power source of claim 1 wherein the means for generating said trigger pulses comprises a voltage controlled oscillator and a divider for dividing the frequency of the output of the voltage controlled oscillator, the trigger pulses being the output of the divider.

5. The power source of claim 1 wherein a third one of the trigger pulses is fed to the programmer means as a synch pulse therefor, said third one of the trigger pulses appearing during a "quiet" time between successive welding current pulses.

6. The power source of claim 1 wherein the means for sensing the welding current comprises a flux sensor.

7. The power source of claim 1 wherein the means for coupling the current pulses passing between the current carrying electrodes of the electronic switching means to the arc weld electrodes includes a transformer.

8. The power source of claim 7 wherein the inductance of the commutating inductor is approximately ten times that of the primary winding of the transformer.

9. The power source of claim 4 wherein the divider divides the frequency of the oscillator by a factor of 10.

10. The power source of claim 7 wherein the means for coupling the current pulses to the arc welder electrodes further includes a rectifier for converting said pulses to DC pulses.

* * * * *